United States Patent [19]
Oh

[11] Patent Number: 6,138,133
[45] Date of Patent: Oct. 24, 2000

[54] CIRCUIT FOR CALCULATING THE INVERSE OF AN ARBITRARY ELEMENT OF A FINITE FIELD

[75] Inventor: Young-Uk Oh, Suwon, Rep. of Korea

[73] Assignee: Samsung Electronics Co., Ltd., Kyungki-do, Rep. of Korea

[21] Appl. No.: 09/099,275

[22] Filed: Jun. 18, 1998

[30] Foreign Application Priority Data

Feb. 6, 1998 [KR] Rep. of Korea ......................... 98-3512

[51] Int. Cl.[7] ..................................................... G06F 7/00
[52] U.S. Cl. .......................................................... 708/492
[58] Field of Search ................................... 708/491, 492, 708/650, 654, 656

[56] References Cited

U.S. PATENT DOCUMENTS

| 4,975,867 | 12/1990 | Weng | 708/492 |
| 5,379,243 | 1/1995 | Greenberger et al. | 708/492 |
| 5,467,297 | 11/1995 | Zook | 708/492 |

Primary Examiner—Tan V. Mai
Attorney, Agent, or Firm—F. Chau & Associates, LLP

[57] ABSTRACT

A combinational logic type inversion circuit for calculating the inverse of an arbitrary element $\alpha^i$ in a finite field, includes a power and multiplication circuit for calculating a primitive element $\alpha^i$ raised to the $(2^1)$-th power through a primitive element $\alpha^i$ raised to the $(2^{m-1})$-th power and multiplying all of the primitive elements $\alpha^i$ raised to the $(2^1)$-th power through $\alpha^i$ raised to the $(2^{m-1})$-th power together to generate an output $M_{OUT}$, and a divider circuit for dividing the output $M_{OUT}$ of the power and multiplication circuit by the primitive element $\alpha$ raised to the $(2^m-1)$-th power.

11 Claims, 2 Drawing Sheets

CIRCUIT FOR CALCULATING THE INVERSE OF AN ARBITRARY ELEMENT OF A FINITE FIELD

FIELD OF THE INVENTION

The present invention relates generally to digital data communications and signal processing and, more particularly, to a circuit for obtaining the inverse of elements of a finite field.

BACKGROUND OF THE INVENTION

With the improvement of digital signal processing, finite field operations have been adopted in many applications such as error correction systems, switching systems, cryptography systems, and the like. In such systems, it is necessary to employ an error control scheme in order to increase the transfer rate of information and at the same time maintain a low error rate. A finite field is a finite set of binary numbers used, for instance, to correct errors during transmission of data which are encoded into error correction codes such as Reed-Solomon, Bose-Chaudhuri-Hocquenghem (BCH) codes, or the like. Specifically, the Galois field $GF(2^m)$, a particular type of finite field, has been the most widely used in the above-described application fields.

For example, in order to calculate correction coefficients in a Reed-Solomon decoder in which finite Galois field operations are performed, it is necessary to calculate a ratio A/B, where A and B are numbers calculated by the decoder and which may have arbitrary values. For this division, A is generally multiplied by the inverse of B. In such a decoder, it is thus required to produce the inverse of an arbitrary primitive element.

The inverse $(\alpha^i)^{-1}$ of a primitive element $(\alpha^i)$ of the Galois field $GF(2^m)$ (where, m denotes the number of elements or code length) is represented as:

$$(\alpha^i)^{-1} = \alpha^{n-i} \qquad (1)$$

where, $n = 2^m - 1$.

For example, in $GF(2^8)$, the inverse of a primitive element $\alpha^2$, i.e., $(\alpha^2)^{-1} = \alpha^{255-2} = \alpha^{253}$.

One of the most common methods of performing element inversion in $GF(2^m)$ is the use of a look-up table which consists of a Read Only Memory (ROM) as shown in FIG. 1. The technique using a ROM is disclosed in Kuang Yung Lin, "Architecture for VLSI Design of Reed-Solomon Decoders", *IEEE Transactions on Computers*, Vol. C-33, No. 2, pp. 178–189, Feb. 1984. The ROM stores, in advance, the inverses of all elements in $GF(2^m)$. An arbitrary primitive element $\alpha^i$, or equivalent, is applied to the input of the ROM as an address so that its inverse $(\alpha^i)^{-1}$ is outputted from the ROM. Here, the inverse stored in the ROM, as well as the address, consists of m bits, and thus the size of the ROM is $2^m \times m$.

However, the use of a ROM may be unsuitable for integration with other processing circuits, given the existing normal techniques for designing integrated circuits. With these techniques, the ROM may be located outside an area where the other elements of the processing circuits are integrated. In addition, if the number of bits of an element in $GF(2^m)$ (i.e., m) increases, the required memory size will increase by a geometric progression. Although a ROM occupies a relatively small area, this geometric progression prevents reduction of the circuit size.

SUMMARY OF THE INVENTION

It is an object of the present invention to provide a circuit for producing the inverse of an arbitrary element in a finite field which is smaller and less expensive, due to its simple structure, than conventional circuits for producing the same.

In one aspect of the present invention, a circuit is provided which is capable of obtaining the inverse of an arbitrary primitive element $\alpha^i$ of a finite field $GF(2^m)$ in, preferably, only about three clock cycles. The inversion circuit includes means for calculating the primitive element $\alpha^i$ raised to the $(2^1)$-th power through the primitive element $\alpha^i$ raised to the $(2^{m-1})$-th power, means for multiplying together all of the primitive elements $\alpha^i$ raised to the $(2^1)$-th power through $\alpha^i$ raised to the $(2^{m-1})$-th power and generating an output signal corresponding thereto, and means for dividing an output signal of the multiplying means by the primitive element $\alpha$ raised to the $(2^m-1)$-th power to generate the inverse of the arbitrary primitive element $\alpha^i$. The circuit of the invention is preferably a combinational logic circuit.

According to this invention, the usage of ROM in a decoder can be avoided, thereby reducing the circuit size of a decoder while still increasing the code length of the finite field. Since the inversion is also preferably completed in only three clock cycles, a high speed decoder is advantageously obtained.

These and other objects, features and advantages of the present invention will become apparent from the following detailed description of illustrative embodiments thereof, which is to be read in connection with the accompanying drawings in which like reference numerals denote same or similar elements.

DETAILED DESCRIPTION OF PREFERRED EMBODIMENTS

A preferred embodiment of the present invention will now be described with reference to the accompanying drawings.

Figure 1:
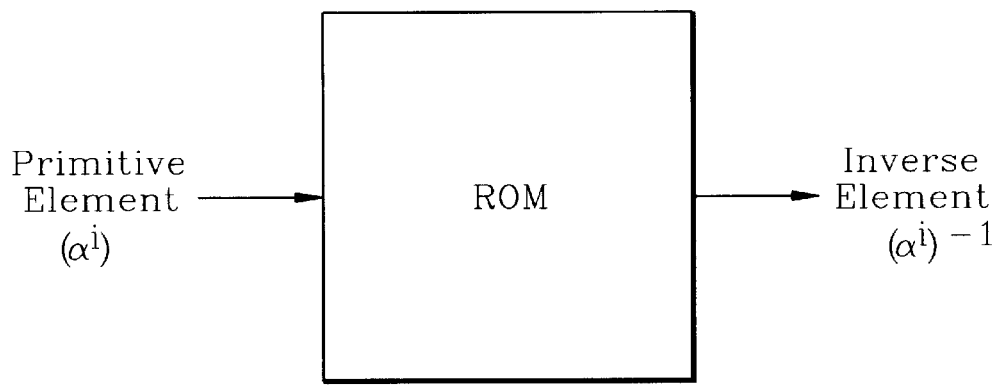
FIG. 1 is a diagram illustrating a conventional look-up table for producing the inverse of an arbitrary element in a finite field.
Figure 2:
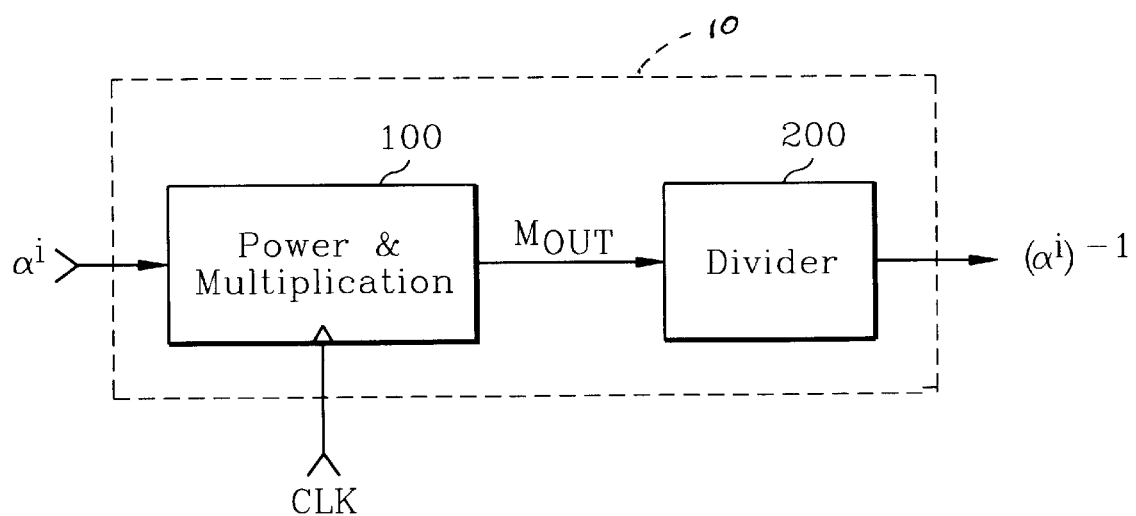
FIG. 2 is a block diagram illustrating a circuit for calculating the inverse of an arbitrary element in a finite field according to the present invention.

FIG. 2 illustrates an inversion circuit 10 for calculating the inverse of an arbitrary element in a finite field according to the invention. Referring to FIG. 2, the inversion circuit 10 includes a power and multiplication circuit 100 for calculating a primitive element $\alpha^i$ raised to the $(2^1)$-th power through a primitive element $\alpha^i$ raised to the $(2^{m-1})$-th power and for multiplying together all of the primitive elements including $\alpha^i$ raised to the $(2^1)$-th power through $\alpha^i$ raised to the $(2^{m-1})$-th power to generate an output signal $M_{OUT}$. The inversion circuit 10 also includes a divider circuit 200, connected to the power and multiplication circuit 100, for dividing the output $M_{OUT}$ of the power and multiplication circuit 100 by the primitive element $\alpha$ raised to the $(2^m-1)$-th power.

Figure 3:
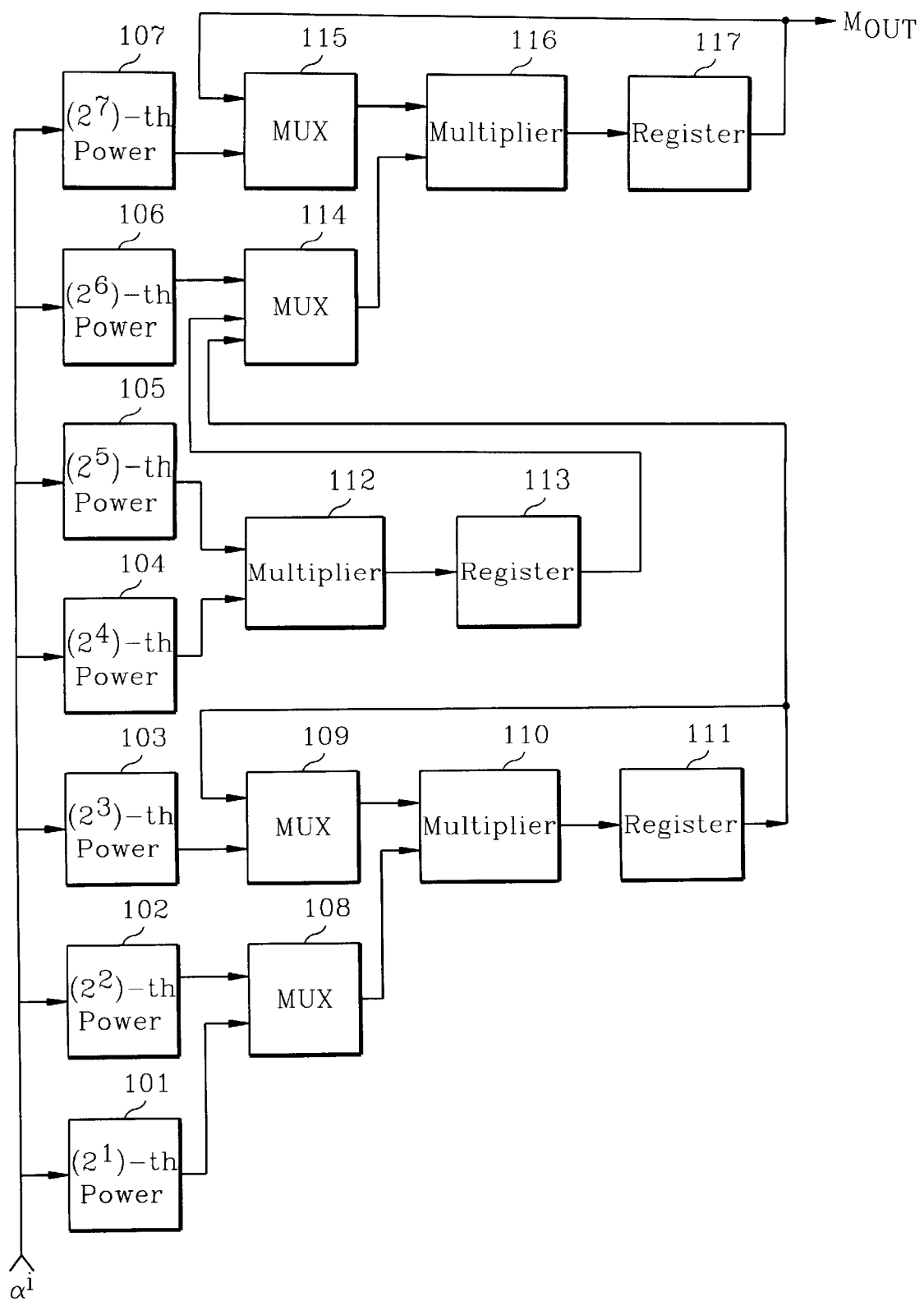
FIG. 3 is a circuit diagram of an exemplary element of the power and multiplication circuit of FIG. 2.

FIG. 3 is a detailed circuit diagram of an example of the power and multiplication circuit 100 of FIG. 2, which is suitable for a finite Galois field $GF(2^8)$. It is to be appreciated that the choice of a finite Galois field $GF(2^8)$ is merely illustrative in nature and the invention is not limited to only this particular sized finite Galois field. Referring to FIG. 3, the power and multiplication circuit 100 in this example includes first through seventh power calculating circuits

101–107 which respectively calculate $\alpha^i$ raised to the $(2^1)$-th power through $\alpha^i$ raised to the $(2^7)$-th power from an 8 bit input $\alpha^i$ (i.e., arbitrary primitive element). The $\alpha^i$ raised to the $(2^1)$-th power (i.e., $(\alpha^i)^2$) through the $\alpha^i$ raised to the $(2^7)$-th power (i.e., $(\alpha^i)^{128}$) may be obtained by the following equations (2) to (8), respectively. In the following equations (2) through (8), $\alpha 0$ to $\alpha 7$ represent the LSB (Least Significant Bit) to the MSB (Most Significant Bit) of the 8 bit primitive element $\alpha^i$, respectively, and $q(0)$ through $q(7)$ represents the LSB to the MSB of the $\alpha^i$ raised to the $(2^1)$-th through the $(2^7)$-th powers, respectively.

$(\alpha^i)^2$:

q(0)=α0+α4+α6+α7 q(1)=α7 q(2)=α1+α4+α5+α7 q(3)=α4+α6 q(4)=α2+α4+α5+α7 q(5)=α5 q(6)=α3+α5+α7 q(7)=α6   (2)

$(\alpha^i)^4$:

q(0)=α0+α4+α3+α6 q(1)=α6 q(2)=α2+α3+α4+α5+α6 q(3)=α2+α3+α4+α6+α7 q(4)=α1+α2+α5+α7 q(5)=α5 q(6)=α3+α4 q(7)=α3+α5+α6   (3)

$(\alpha^i)^8$:

q(0)=α0+α1+α3+α4+α7 q(1)=α3+α5+α6 q(2)=α1+α2+α3+α4+α6+α7 q(3)=α1+α2+α3+α4+α5+α7 q(4)=α1+α4+α7 q(5)=α5 q(6)=α2+α5+α6+α7 q(7)=α3+α4   (4)

$(\alpha^i)^{16}$:

q(0)=α0+α2+α4+α5+α6+α7 q(1)=α3+α4 q(2)=α1+α2+α3+α4+α5 q(3)=α1+α2+α4+α5+α6 q(4)=α2+α4+α5+α6 q(5)=α5 q(6)=α1+α3+α4+α5+α6 q(7)=α2+α5+α6+α7   (5)

$(\alpha^i)^{32}$:

q(0)=α0+α1+α2+α3+α4 q(1)=α2+α5+α6+α7 q(2)=α1+α2+α4+α5 q(3)=α1+α2+α3 q(4)=α1+α2+α3+α7 q(5)=α5 q(6)=α2+α3+α5 q(7)=α1+α3+α4+α5+α6   (6)

$(\alpha^i)^{64}$:

q(0)=α0+α1+α2+α6+α7 q(1)=α1+α3+α4+α5+α6 q(2)=α1+α2+α5+α6 q(3)=α1+α5+α7 q(4)=α1+α5+α6+α7 q(5)=α5 q(6)=α1 q(7)=α2+α3+α5   (7)

$(\alpha^i)^{128}$:

q(0)=α0+α1+α3 q(1)=α2+α3+α5 q(2)=α1+α3+α4+α5+α7 q(3)=α5+α6+α7 q(4)=α3+α7 q(5)=α5 q(6)=α7 q(7)=α1   (8)

Continuing to refer to FIG. 3, the power and multiplication circuit 100 further includes first through fourth multiplexers 108, 109, 114 and 115, first through third Galois field multipliers 110, 112 and 116, and first through third registers 111, 113 and 117.

Two input ports of multiplexer 108 are connected with the output ports of the power circuits 101 and 102, respectively. The output port of the multiplexer 108 is connected with an input port of the field multiplier 110. Two input ports of the multiplexer 109 are connected with the output ports of power circuit 103 and the register 111, respectively. The output port of the multiplexer 109 is connected with the outer input port of the field multiplier 110. The output ports of the power circuits 104 and 105 are respectively connected to the input ports of the field multiplier 112 having an output port connected with the input port of the register 113. The multiplexer 114 has three input ports of which two are connected with the output ports of the registers 111 and 113, respectively, and the other port is connected with the output port of the power circuit 106. The output port of the multiplexer 114 is connected with an input port of the field multiplier 116. One input port of the multiplexer 115 is connected with the output port of the power circuit 107 and the other port thereof is connected with the output port of register 117. The output port of the multiplexer 115 is connected with the other input port of the field multiplier 116 whose output port is connected to the input port of the register 117. The output port of the register 117 is also provided to the divider circuit 200. The divider circuit 200 divides an output signal of the register 117 by the primitive element α raised to the $(2^8-1)$-th power. Any conventional divider circuit may be implemented to perform such division and, thus, one of ordinary skill in the art will be able to appreciate ways to implement such circuit.

All the components of the power and multiplication circuit 100 are connected to and operated with externally applied clock CLK. The following TABLE 1 shows the calculation values in the respective clock cycles, and the following TABLE 2 shows the operation states of the three multipliers 110, 112 and 116.

TABLE 1

| Clock Cycle | Calculation Values |
|---|---|
| 1st cycle | $(\alpha^i)^2, (\alpha^i)^4 \cdot (\alpha^i)^8, (\alpha^i)^{16} \cdot (\alpha^i)^{32}, (\alpha^i)^{64} \cdot (\alpha^i)^{128}$ |
| 2nd cycle | $(\alpha^i)^2 \cdot (\alpha^i)^4 \cdot (\alpha^i)^8, (\alpha^i)^{16} \cdot (\alpha^i)^{32} \cdot (\alpha^i)^{64} \cdot (\alpha^i)^{128}$ |
| 3rd cycle | $(\alpha^i)^2 \cdot (\alpha^i)^4 \cdot (\alpha^i)^8 \cdot (\alpha^i)^{16} \cdot (\alpha^i)^{32} \cdot (\alpha^i)^{64} \cdot (\alpha^i)^{128}$ |

TABLE 2

| Clock Cycle | 1st multiplier (110) | 2nd multiplier (112) | 3rd multiplier (116) |
|---|---|---|---|
| 1st cycle | $(\alpha^i)^4 \cdot (\alpha^i)^8$ | $(\alpha^i)^{16} \cdot (\alpha^i)^{32}$ | $(\alpha^i)^{64} \cdot (\alpha^i)^{128}$ |
| 2nd cycle | $(\alpha^i)^2 \cdot (\alpha^i)^4 \cdot (\alpha^i)^8$ | | $(\alpha^i)^{16} \cdot (\alpha^i)^{32} \cdot (\alpha^i)^{64} \cdot (\alpha^i)^{128}$ |
| 3rd cycle | | | $(\alpha^i)^2 \cdot (\alpha^i)^4 \cdot (\alpha^i)^8 \cdot (\alpha^i)^{16} \cdot (\alpha^i)^{32} \cdot (\alpha^i)^{64} \cdot (\alpha^i)^{128}$ |

Referring to TABLEs 1 and 2, in a first clock cycle, the respective outputs $(\alpha^i)^4$, $(\alpha^i)^8$, $(\alpha^i)^{64}$, and $(\alpha^i)^{128}$ of the power circuits 102, 103, 106 and 107 are selected by the multiplexers 108, 109, 114 and 115, respectively. The field multiplier 110 multiplies $(\alpha^i)^4$ by $(\alpha^i)^8$, the multiplier 112 multiples $(\alpha^i)^{16}$ by $(\alpha^i)^{32}$, and the multiplier 116 multiplies $(\alpha^i)^{64}$ by $(\alpha^i)^{128}$. The values $(\alpha^i)^4 \cdot (\alpha^i)^8$, $(\alpha^i)^{16} \cdot (\alpha^i)^{32}$, and $(\alpha^i)^{64} \cdot (\alpha^i)^{128}$ are stored in the registers 111, 113 and 117, respectively.

In a second clock cycle, the multiplexer 108 selects the output $(\alpha^i)^2$ of the power circuit 101 and the multiplexer 109 selects the outputs $(\alpha^i)^4 \cdot (\alpha^i)^8$ of the register 111. The multiplier 110 multiplies the values $(\alpha^i)^2$ and $(\alpha^i)^4 \cdot (\alpha^i)^8$ together. The output $(\alpha^i)^2 \cdot (\alpha^i)^4 \cdot (\alpha^i)^8$ of the multiplier 110 is stored in the register 111. In addition, during this cycle, the multiplexers 114 and 115 select the outputs $(\alpha^i)^{16} \cdot (\alpha^i)^{32}$ and $(\alpha^i)^{64} \cdot (\alpha^i)^{128}$ of the register 113 and 117, respectively. The values $(\alpha^i)^{16} \cdot (\alpha^i)^{32}$ and $(\alpha^i)^{64} \cdot (\alpha^i)^{128}$ are multiplied by multiplier 116, and then the resultant value $(\alpha^i)^{16} \cdot (\alpha^i)^{32} \cdot (\alpha^i)^{64} \cdot (\alpha^i)^{128}$ is stored in the register 117.

In a third clock cycle, the multiplexer 114 selects the output $(\alpha^i)^2 \cdot (\alpha^i)^4 \cdot (\alpha^i)^8$ of the register 111, and the multi-plexer 115 selects the output $(\alpha^i)^{16} \cdot (\alpha^i)^{32} \cdot (\alpha^i)^{64} \cdot (\alpha^i)^{128}$ of the register 117. The multiplier 116 multiplies $(\alpha^i)^{16} \cdot (\alpha^i)^{32} \cdot (\alpha^i)^{64} \cdot (\alpha^i)^{128}$ by $(\alpha^i)^2 \cdot (\alpha^i)^4 \cdot (\alpha^i)^8$. In this cycle, the final output $(\alpha^i)^2 \cdot (\alpha^i)^4 \cdot (\alpha^i)^8 \cdot (\alpha^i)^{16} \cdot (\alpha^i)^{32} \cdot (\alpha^i)^{64} \cdot (\alpha^i)^{128}$ of the multiplier 116 is provided to the divider circuit 200 via the register 117 (where the final output is also stored), and then the final output is divided by α raised to the $(2^m-1)$-th power in the divider circuit 200.

In a case where the inverse of a primitive element $(\alpha^2)$ is calculated, the final output of the multiplier 116 is $(\alpha^2)^2 \cdot (\alpha^2)^4 \cdot (\alpha^2)^8 \cdot (\alpha^2)^{16} \cdot (\alpha^2)^{32} \cdot (\alpha^2)^{64} \cdot (\alpha^2)^{128} = \alpha^{508}$. In the divider circuit 200, the final output $\alpha^{508}$ of the multiplier 116 is divided by α raised to the $(2^m-1)$-th power. If the code length of the finite field is m=8 bits, the final output $\alpha^{508}$ of the multiplier 116 is divided by $\alpha^{255}$. Consequently, the inverse of the primitive element $(\alpha^2)$, i.e., the output of divider circuit 200, is $\alpha^{508-255}(=\alpha^{253})$. The result is identical with the result obtained using equation (1).

Although the invention has been described and illustrated in the above description and drawings, it is understood that this description is an example only. That is, the configuration of the power and multiplication circuit can vary predictively with the code length m of the finite field $GF(2^m)$. Numerous changes and modifications can be made by those skilled in the art without departing from the true spirit and scope of the invention.

What is claimed is:

1. A circuit for calculating an inverse of an arbitrary primitive element $\alpha^i$ of a finite field $GF(2^m)$, comprising:

means for calculating the element $\alpha^i$ raised to the $(2^1)$-th power through the element $\alpha^i$ raised to the $(2^{m-1})$-th power;

means for multiplying together elements $\alpha^i$ raised to the $(2^1)$-th power through $\alpha^i$ raised to the $(2^{m-1})$-th power and generating an output signal corresponding thereto; and means for dividing the output signal of said multiplying means by α raised to the $(2^m-1)$-th power to generate the inverse of the element $\alpha^i$.

2. The circuit according to claim 1, wherein said multiplying means comprises at least one multiplexer.

3. The circuit according to claim 1, wherein said multiplying means comprises at least one field multiplier.

4. The circuit according to claim 1, wherein said multiplying means comprises at least one register.

5. The circuit according to claim 1, further comprising timing means for timing the calculating and multiplying means.

6. The circuit according to claim 5, wherein the inverse of element $\alpha^i$ is generated in about three clock cycles.

7. A circuit for calculating an inverse of an arbitrary primitive element $\alpha^i$ of a finite field $GF(2^8)$, comprising:

first through seventh power circuits, having respective input ports for receiving $\alpha^i$ and respective output ports, for calculating the primitive element $\alpha^i$ raised to the $(2^1)$-th power through the primitive element $\alpha^i$ raised to the $(2^7)$-th power, respectively;

a first multiplexer having a first input port connected with an output port of the first power circuit, a second input port connected with the second power circuit, and an output port;

a second multiplexer having a first input port connected with an output port of the third power circuit, a second input port, and an output port;

a first field multiplier for multiplying output signals of the first and second multiplexers;

a register having an input port connected with an output port of the first field multiplier and an output port connected with the second input port of the second multiplexer, for storing an output signal of the first field multiplier;

a second field multiplier for multiplying the output signals of the fourth and fifth power circuits;

a second register having an input port connected with an output port of the second field multiplier and an output port, for storing an output signal of the second field multiplier;

a third multiplexer having a first input port connected with the output port of the first register, a second input port connected with the output port of the second register, a third input port connected with an output port of the sixth power circuit, and an output port;

a fourth multiplexer having an input port connected with an output port of the seventh power circuit, a second input port, and an output port;

a third field multiplier for multiplying output signals of the third and fourth multiplexers;

a third register having an input port connected with an output port of the third field multiplier and an output port connected with the second input port of the fourth multiplexer, for storing an output signal of the third field multiplier; and a divider for dividing an output signal of the third field multiplier by a primitive element $\alpha$ raised to the $(2^8-1)$-th power to generate the inverse of the primitive element $\alpha^i$.

8. A method for determining an inverse of an arbitrary primitive element $\alpha^i$ of a finite field $GF(2^m)$, comprising the steps of:

(a) calculating the element $\alpha^i$ raised to the $(2^1)$-th power through $\alpha^i$ raised to the $(2^{m-1})$-th power;

(b) multiplying in a multiplier elements $\alpha^i$ raised to the $(2^1)$-th power through $\alpha^i$ raised to the $(2^{m-1})$-th power and generating an output signal corresponding thereto; and (c) dividing in a divider the output signal of said multiplying step by $\alpha$ raised to the $(2^{m-1})$-th power to obtain an inverse of said arbitrary primitive element.

9. The method according to claim 8, wherein said calculating, multiplying and dividing steps are performed in about three clock cycles.

10. The method according to claim 8, wherein at least a portion of said output signal from said multiplying step is stored in a register.

11. The method according to claim 8, wherein said multiplying and dividing steps include the step of selectively directing portions of signals from said multiplier to said divider through a multiplexer.

* * * * *